United States Patent
Engle

[19]

[11] Patent Number: 5,867,301
[45] Date of Patent: *Feb. 2, 1999

[54] PHASE MODULATING DEVICE

[76] Inventor: Craig D. Engle, 336 Cline Ave, Griffith, Ind. 46319

[*] Notice: The term of this patent shall not extend beyond the expiration date of Pat. Nos. 5,623,361 and 5,521,746.

[21] Appl. No.: 636,155

[22] Filed: Apr. 22, 1996

[51] Int. Cl.$^6$ .................................................. G02B 26/00
[52] U.S. Cl. ............................................................. 359/291
[58] Field of Search .................................... 359/290, 291, 359/292, 293, 294, 295

[56] References Cited

U.S. PATENT DOCUMENTS

| | | | |
|---|---|---|---|
| 3,445,707 | 5/1969 | Gilvey et al. | 313/68 |
| 3,480,348 | 11/1969 | Preston, Jr. | 359/291 |
| 3,626,084 | 12/1971 | Wohl et al. | 178/7.5 D |
| 3,835,346 | 9/1974 | Mast et al. | 313/394 |
| 4,494,826 | 1/1985 | Smith | 350/360 |
| 4,879,602 | 11/1989 | Glenn | 358/233 |
| 5,044,736 | 9/1991 | Jaskie et al. | 359/291 |
| 5,521,746 | 5/1996 | Engle | 359/292 |

OTHER PUBLICATIONS

K. Hess et al, "Deformable Surface Spatial Light Modulator" Optical Engineering/May 1987/vol. 26 No. 5.

R. Tepe et al, Viscoelastic Control Layers for Solid State Light Valves, SPIE vol. 684 Liquid Crystals and Spatial Light Modulators Material (1986).

W. Brinker et al "Deformation Behavior of Thin Viscoelastic Layers Used in an Active Matrix Addressed Spatial Light Modulator" SPIE vol. 1018 Electro–Optic and Magneto–Optic Materials.

Craig D. Engle, Enhanced Wavefront Phase Modulator Device, filed Feb. 17, 1995, ser. nr. 08/390,690.

N. Sheridon, "The Ruticon Family of Erasable Image Recording Devices" IEEE Transaction on Electron Devices, Sep. 1972.

R. Tepe, "Theoretical Analysis of an Electrically Addressed Viscoelastic Spatial Light Modulator" vol. 4, No. 7/Jul. 1987/J. Opt. Soc, Am A.

Eugene T. Kozol et al, "Dielectric Membrane Light Value Study", Section 5.2.2 titled Reflective versus Transmissive Systems RADC–TR–71.

Larry J. Hornbeck, "Deformable–Mirror Spatial Light Modulators" SPIE Critical Reviews Series vol. 1150.

Craig D. Engle, patent application, Ser. No. 08/180,029, filing date Jan. 11, 1994, titled "Electronically Addressed Deformable Media Light Modulator".

Craig D. ngle, patent application, serial number 08/020,692, filing date Feb. 22, 1993, titled "Poppet Valve Modulator".

Eugene Hecht and Alfred Zajac, Optics, Addision wesley Publishing co. copyright 1974, Section 9.9.

*Primary Examiner*—Georgia Epps
*Assistant Examiner*—Dawn-Marie Bey

[57] ABSTRACT

A surface deformation type wavefront phase modulator (36) utilizes a transmissive deformable conductor (30) affixed to a single layer of transmissive deformable media (24). Media (24) is affixed to a substrate (12). A dielectric reflector (18) is affixed to the substrate (12). Conductor (30) is opposite the substrate (12). Electrostatic forces are applied to the conductor (30) to vary the deformation of media (24) and conductor (30) to phase modulate a wavefront which is incident on conductor (30), traverses media 24 and is reflected by reflector (18) to again traverse the media (24). Several advantages are inherent in my invention. Utilizing a transmissive deformable conductor (30) avoids the compromises involving reflectivity and conductor thickness which has plagued prior art devices.

17 Claims, 4 Drawing Sheets

PHASE MODULATING DEVICE

BACKGROUND

1. Field of Invention

This invention relates to surface deformation type wavefront phase modulators.

2. Prior Art

Prior art surface deformation type wavefront phase modulators have suffered from a multitude of problems. Devices which utilize a reflective deformable surface are plagued by the complications cited in U.S. Pat. No. 4,879,602 to Glenn, Nov. 7, 1989. As identified by Glenn, tradeoffs involving reflectivity and conductor thickness, a compromise inherent with the utilization of deformable reflectors, adversely effects performance. In addition, intrusion of the incident light onto the control mechanism presents additional problems associated with the utilization of deformable reflectors.

Previous alternatives to the utilization of a deformable reflector include the device described in the article titled "Deformable Surface Spatial Light Modulator" by K, Hess et al, Optical Engineering May 1987, Vol. 26, No. 5. and the device described in U.S. Pat. No. 3,835,346 to Mast et al, Sep. 10, 1974. Configurations which rely upon a separation gap between the deformable media and a control mechanism suffer from several complications. As identified in the article titled "Viscoelastic Control Layers for Solid-State Light Valves" by R. Tepe, et al, SPIE Vol. 684 Liquid Crystals and Spatial Light Modulators Materials, 1986, page 27, such gaps must be very thin and extremely parallel.

In addition, as identified in the article titled "Deformation Behavior of Thin Viscoelastic Layers Used in an Active Matrix Addressed Spatial Light Modulator" by W. Brinker et al SPIE Vol. 1018 Electro-Optic and Magnetic Materials 1988, page 82, elastic electrodes affixed to the deformable media layer leads to a faster response time. Such considerations are important for real time operation of phase modulators.

Additional surface deformation type wavefront phase modulators include the device described in U.S. Pat. No. 4,494,826 to Smith, Jan. 22, 1985. In U.S. Pat. No. 4,494,826 the read light is reflected by a deformable reflective conductor. As such, this device is plagued by the compromises identified in U.S. Pat. No. 4,879,602 to Glenn. In addition, by failing to allow the read light to be reflected from within the deformable media, U.S. Pat. No. 4,494,826 fails to achieve the advantages inherent to applicant's invention.

Accordingly, a need exists for a device which overcomes the limitations of prior art.

OBJECTS AND ADVANTAGES

Accordingly, several objects and advantages of my invention are:
1) To identify how to simplify surface deformation wavefront phase modulator construction by eliminating extraneous components which hinder performance while simultaneously providing a means to enhance performance thereby demonstrating the synergism which is present in my invention.
2) To identify surface deformation wavefront phase modulator device configurations which avoids compromises involving reflectivity and/or deformable conductor thickness.
3) To identify addressing schemes and/or applications which are utilizable with and benefit from my invention.
4) To provide evidence of how my invention enhances modulator performance.
5) To identify advantages of my invention such as enhancing the reflectivity of surface deformation wavefront phase modulators.
6) To identify how to utilize transmissive deformable insulator layers in surface deformation types wavefront phase modulators.

Further objects and advantages of my invention will become apparent from a consideration of the drawings and ensuing description of it.

LISTS OF FIGURES

In the drawings, closely related figures have the same number but different alphabetic suffixes.

FIG. 6 shows a reflective phase modulator utilizing an essentially non deforming multilayer dielectric reflector affixed to a rigid transmissive substrate.

DESCRIPTION OF INVENTION

Figure 1:
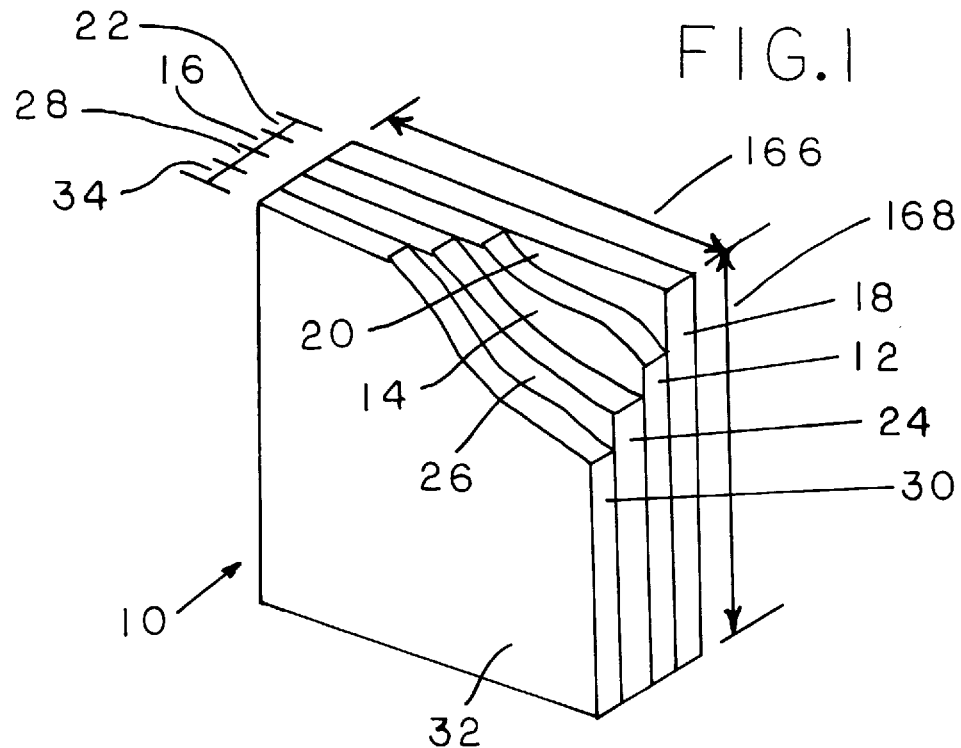
FIG. 1 shows a surface deformation type wavefront phase modulator target which utilizes a reflective means affixed to a surface of a substrate which opposes the transmissive deformable media layer.

FIG. 1 shows a surface deformation type wavefront phase modulator target 10. Certain portions of the figure has been shown cutaway for clarity. Target 10 further includes a substrate 12. Substrate 12 further includes a first surface 14 and a second surface. The second surface is not visible in the figure. Surface 14 and the second surface are essentially parallel planes separated by a substrate thickness 16. Thickness 16 is perpendicular to surface 14. Substrate 12 is essentially a rigid, non deforming support. Materials utilizable for substrate 12 include glass, ceramics and mica.

Affixed to the second surface of substrate 12 is a multilayer dielectric reflector 18. Multilayer dielectric reflectors are well understood by those knowledgeable in the state of the art and reflector 18 is shown as a single layer in the figure for convenience. Reflector 18 further includes a first surface 20 and a second surface. The second surface of reflector 18 is not visible in the figure. Surface 20 and the second surface of reflector 18 are essentially parallel planes separated by a reflector thickness 22. Thickness 22 is perpendicular to surface 20. Surface 20 is affixed to the second surface of substrate 12.

Affixed to surface 14 of substrate 12 is a single layer of transmissive deformable media 24. Media 24 further includes a first surface 26 and a second surface. The second surface of media 24 is not visible in the figure. The second surface of media 24 is adjacent to and in contact with surface 14. The second surface of media 24 is affixed to surface 14. The second surface of media 24 adheres to surface 14.

In an undeformed state, surface 26 and the second surface of media 24 are essentially parallel planes separated by a media thickness 28. Media 24 comprises a single layer of deformable media. In an undeformed state, thickness 28 is essentially perpendicular to surface 26. Material utilized as media 24 possess an index of refraction N.

In my invention, the second surface of media 24 is in contact with surface 14 of an essentially rigid non deforming substrate 12. The second surface of media 24 is constrained to be stationary, i.e. the second surface of media 24 resides in a fixed location in space independent of time. My invention utilizes a rigid substrate to assist in generating stationary boundary conditions on the second surface of media 24. Such a consideration is a distinguishing feature of my invention and contributes to the ability to phase modulate a wavefront with a single layer of media.

Affixed to surface 26 is a transmissive deformable conductor 30. Conductor 30 further includes a first surface 32 and a second surface. The second surface of conductor 30 is not visible in the figure. In an undeformed state, surface 32 and the second surface of conductor 30 are separated by a conductor thickness 34. In an undeformed state, thickness 34 is essentially perpendicular to surface 32. The second surface of conductor 30 is affixed to surface 26 of media 24. Conductor 30 is highly transparent and essentially non reflecting. Use of a highly transparent essentially non reflecting conductor avoids comprises involving reflectivity and deformation efficiency which have plagued prior art devices which utilize deformable reflectors. By eliminating reflectivity considerations associated with the deformable conductor, my invention enhances reflectivity and deformation efficiency of surface deformation type wavefront phase modulators.

As identified in the reference cited herein, use of a conducting reference surface affixed to a deformable media provides an elastic means to enhance the speed of response of the deformable media. Applicant's invention provides this feature and utilizes a transmissive deformable conductor to avoid the pitfalls of prior art devices. This additional attribute and other features to be described herein demonstrate the synergism present in my invention. As to be described herein, alternative techniques exist to enhance the speed of response of the deformable media. Such techniques include utilizing a transmissive deformable insulator affixed to surface 26 of layer 24.

Target 10 further includes a first lateral dimension 166 and a second lateral dimension 168. Dimension 166 is perpendicular to thickness 16 and dimension 168. Dimension 168 is perpendicular to thickness 16.

As identified in the patent application admitted to Craig D. Engle titled "Enhanced Wavefront Phase Modulator Device", filed Feb. 17, 1995, Ser. No. 08/390,690, the target described in FIG. 1 is capable of being electron beam addressed. As to be shown herein, alternative configurations are utilized to phase modulate a wavefront which traverses the target configurations of my invention in accordance with an information bearing signal.

Material selection for the various components utilized in target 10 are dependent, in part, on the target configuration and the addressing mechanism utilized. Materials utilizable in the targets of my invention will be identified herein.

By affixing the reflector to the substrate and utilizing a deformable transmissive conductor affixed to a surface of the deformable media which opposes the substrate, my invention avoids the compromises involving reflectivity and conductor thickness which have plagued prior art devices. Affixing reflector 18 to substrate 12 results in an essentially rigid, non deforming reflective means. Reflector 18 is stationary.

Figure 2:
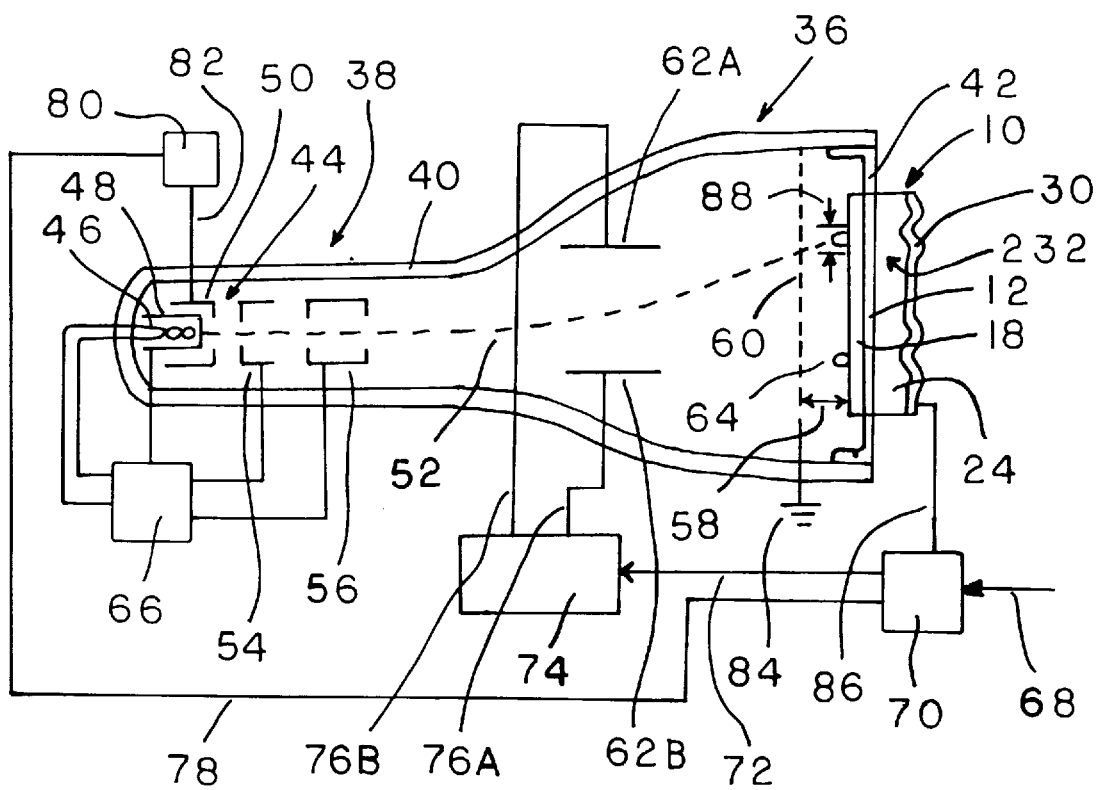
FIG. 2 shows an electron beam addressed surface deformation type wavefront phase modulator.

FIG. 2 shows an electron beam addressed phase modulator 36. Modulator 36 further includes target 10. Modulator 36 further includes an electron beam addressing mechanism 38. Mechanism 38 further includes a vacuum envelope 40. Envelope 40 is fabricated from any suitable material, such as glass, and is of any suitable shape. Materials and shape consideration of vacuum envelopes for use in electron beam addressed devices are well understood by those knowledgeable in the state of the art.

Target 10 is sealed to envelope 40 by the use of a seal ring 42. Techniques to seal a target to a vacuum envelope are well understood by those knowledgeable in the state of the art. See for instance information contained in U.S. Pat. No. 3,445,707, to J. P. Gilvey et al, May 20, 1969. Accordingly, seal ring 42 is now shown in detail.

Mechanism 38 further includes an electron beam gun 44. Gun 44 further includes a filament 46 for heating an electron emissive cathode 48, a first control grid 50 for controlling the beam current of an electron beam 52 generated by gun 44, a second control grid 54 for accelerating electrons in beam 52 and a focusing element 56 for focusing electron beam 52. Electron guns are well understood by those knowledgeable in the state of the art and therefore gun 44 is not show in detail in the figure.

Separated from target 10 by a grid separation distance 58 is an electron collector mesh 60. Electron collector meshes are well understood by those knowledgeable in the state of the art and therefore mesh 60 is not shown in detail.

Mechanism 38 further includes an electron deflection means 62. Deflection means 62 enables electron beam 52 generated by gun 44 to be positioned to any location on the second surface of dielectric reflector 18 of target 10. Deflection means include electrostatic and electromagnetic deflection techniques. As well understood by those knowledgeable in the state of the art, selection of a particular type of deflection technique influences the nature of focusing element 56. Deflection techniques for use in electron beam devices are well understood by those knowledgeable in the state of the art and therefor deflection means 62 is not shown in detail.

As well understood by those knowledgeable in the state of the art, several electron beam read/write techniques exist to deposit an electronic charge 64 on target 10. The preferred writing technique for use in my invention is an equilibrium writing technique described in the patent application admitted to Craig D. Engle titled "Enhanced Wavefront Phase Modulator Device", Ser. No. 08/390,690, filing date Feb. 17, 1995, the teaching of which are officially incorporated herein by reference. Use of an equilibrium writing technique requires that the secondary electron emission ratio of the surface of the target which is being bombarded be capable of exceeding unity. Secondary electron emission curves as a function of primary electron beam energy and the requirements for equilibrium electron beam writing are identified in the references provided herein. Requirements for equilibrium writing are well understood by those knowledgeable in the state of the art.

A voltage source 66 applies voltages to filament 46, cathode 48, focusing element 56 and second control grid 54 for operation consistent with equilibrium writing techniques. The voltages required by mechanism 38 to enable equilibrium writing means to be implemented are well understood by those knowledgeable in the state of the art. The potentials applied to mechanism 38 by voltage source 66 are selected so that electrons associated with electron beam 52 are accelerated by an electron energy which exceed the first crossover point of the curve of secondary electron emission ratio versus primary electron energy and below the second crossover point of the curve for the surface of the target being bombarded by the electron beam.

The equilibrium writing technique for use in my invention applies input voltage variations to conductor 30 of target 10. An information bearing signal 68 is applied to an electronic processing module 70. Module 70 applies a synchronization signal 72 to a deflection amplifier 74. Amplifier 74 applies a deflection waveform 76 to deflection means 62 enabling electron beam 52 to scan target 10. Scan patterns, scan velocities, deflection waveform etc. are well understood by those knowledgeable in the state of the art. The scan pattern associated with my invention is preferably an interlaced raster scan pattern. The raster scan pattern is not shown in the figure for convenience.

Module 70 applies a second synchronization signal 78 to a control grid amplifier 80. Amplifier 80 applies a beam current control voltage 82 to control grid 50 to control the potential difference between cathode 48 and control grid 50 to control the beam current of electron beam 52. Beam current is maintained at a constant level during active scan times of the raster scan pattern and is blanked during retrace periods. Such considerations are well understood by those knowledgeable in the state of the art and not shown in detail.

Mesh 60 is maintained at a ground potential 84. Module 70 applies a voltage signal 86 to conductor 30 to vary the potential difference between mesh 60 and conductor 30 in accordance with signal 68. Electron beam 52 further includes a spot size 88. As well understood by those knowledgeable in the state of the art, the elemental area of target 10 which is bombarded by the instantaneous location of electron beam spot size 88 will acquire net electronic charge 64 which is related to the value of signal 86 applied to conductor 30 at the time the elemental area of target 10 is bombarded by electron beam 52. As well understood by those knowledgeable in the state of the art, use of an electron collector mesh in an equilibrium writing mode enables a stable equilibrium potential of target 10 to be established relative to the potential of mesh 60. Furthermore, the current collected by mesh 60 is dependent upon the magnitude and polarity of the potential difference between the target and mesh. This enables the potential of the surface of target 10 which is being bombarded to be shifted in a positive or negative direction relative to the stable equilibrium potential. Such considerations are well understood by those knowledgeable in the state of the art.

Charge 64 deposited on reflector 18 of target 10 will establish a localized electric field in media 24 of target 10 in accordance with signal 68. The electric fields are not shown in the figure for convenience. As well understood by those knowledgeable in the state of the art, electric fields in media 24 establishes electrostatic forces which act on conductor 30. Electrostatic forces acting on conductor 30 leads to compressional forces which act on media 24. Electrostatic and compressional forces are not shown in the figure for convenience. Information concerning the nature of such forces are provided in the reference cited herein.

Each incremental area of target 10 forms with conductor 30 a respective pixel element 232. The electronic charge deposited at each incremental area, and therefore the respective pixel element 232 influences the phase of the portion of a wavefront traversing the pixel element 232. Accordingly, each pixel element 232 comprises a transmissive deformable conductor, a single layer of transmissive deformable media, a stationary reflective means affixed to a substrate. An electrostatic means is utilized to apply electrostatic forces to the conductor associated with each pixel element.

Electrostatic forces applied to conductor 30 influences the deformation of conductor 30 and the first surface of media 24 since the first surface of media 24 is adjacent to and in contact with conductor 30. The first surface of media 24 is not visible in the figure. Since the second surface of media 24 is stationary, variations in the deformation of the first surface of media 24 lead to thickness variations in media 24. The second surface of media 24 is not visible in the figure.

Compressional forces related to the electrostatic forces applied to conductor 30 influence thickness variations in media 24. Due to conductor 30 being transmissive, a wavefront containing the wavelength(s) of interest which is incident upon conductor 30 will traverses media 24 and substrate 12, impinge on and be reflected by reflector 18 to again traverse substrate 12 and media 24 then exit target 10. Thickness variations in media 24, due to variations in the electric fields in target 10, will lead to optical path length variations in the wavefront which traverses target 10 which leads to phase modulations of the wavefront in accordance with the information bearing signal. The wavefront is not shown in the figure for convenience.

Since the wavefront traverses substrate 12 prior to impinging upon reflector 18, substrate 12 must be transmissive to the wavelengths of the wavefront which are to be phase modulated. In addition, due to charge storage considerations, substrate 12 is preferably insulating. Materials which are utilizable for the substrate of my invention include glass. Considerations involved in designing a dielectric reflector for use in my invention are well understood by those knowledgeable in the state of the art.

Figure 3:
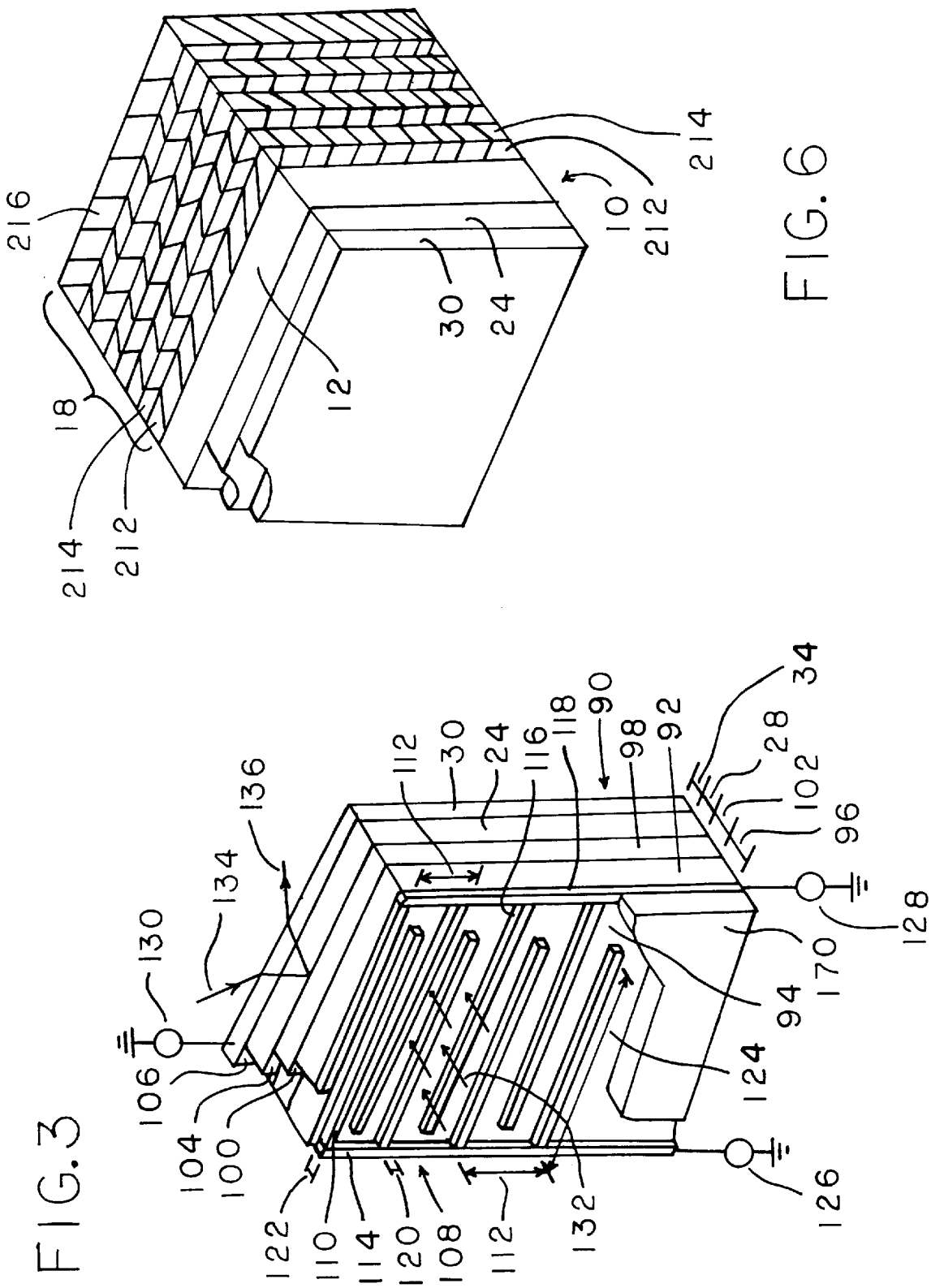
FIG. 3 shows an optically addressed surface deformation type wavefront phase modulator target.

FIG. 3 shows an optically addressed phase modulator target 90. Certain portions of the figure are shown cutaway for clarity. Target 90 further includes a photoconductive substrate 92. Substrate 92 is given a different designation than the substrate associated with FIGS. 1 and 2 to emphasize the latitude available with substrate material selection with my invention. Substrate 92 further includes a second surface 94 and a first surface. The first surface of substrate 92 is not visible in the figure. Surface 94 and the first surface of substrate 92 are essentially parallel planes separated by a substrate thickness 96.

Affixed to the first surface of photoconductive substrate 92 is a dielectric reflector 98. Reflector 98 is given a different designation than the reflectors associated with FIGS. 1 and 2 to emphasize the latitude available in my invention in regards to which surface of the substrate the reflective means may be affixed to. In addition, as well understood by those knowledgeable in the state of the art, the index of refraction of the medium adjacent to a dielectric reflector will influence reflection characteristics of the dielectric reflector. In my invention the medium adjacent to the dielectric reflector is dependent upon which surface of the substrate the dielectric reflector is affixed and/or the addressing mechanism utilized. Such considerations influence the reflection characteristics of the reflector.

Reflector 98 further includes a second surface 100 and a first surface. The first surface of reflector 98 is not visible in the figure. Second surface 100 and the first surface of reflector 98 are essentially parallel planes separated by a reflector thickness 102. Reflector 98 is shown as a single layer in the figure for convenience. As to be described herein, the dielectric reflector configurations utilized in my invention comprises alternating layers of materials possessing a different index of refraction. As well understood by those knowledgeable in the state of the art, the optical thickness of each layer of material comprising the dielectric reflector is dependent upon the quarter wavelength of the primary wavelength to be reflected by the reflector.

Affixed to the first surface of reflector 98 is a single layer of transmissive deformable media 24. Media 24 further includes a second surface 104. In an undeformed state, surface 104 is separated from the first surface of media 24 by thickness 28. The first surface of media 24 is not visible in the figure. Surface 104 is in contact with the first surface of reflector 98. Surface 104 adheres to the first surface of reflector 98. In my invention, reflector 98 is stationary. This establish a boundary condition on media 24. Surface 104 of media 24 is stationary.

Due to the characteristics of the materials utilized to fabricate a dielectric reflector for use in my invention and/or the method of affixing the reflector to the substrate, reflector 98 serves as an essentially non deforming rigid support for layer 24. As a consequence, second surface 104 of media 24 is stationary. Depicting reflector 98 as a single layer of thickness assists in emphasizing this characteristic of my invention.

Target 90 further includes transmissive deformable conductor 30. Conductor 30 further includes a second surface 106. Second surface 106 is separated from the first surface of conductor 30 by conductor thickness 34. The first surface of conductor 30 is not visible in the figure. Surface 106 is affixed to the first surface of media 24.

Thickness 28 of media 24 can typically range from a few microns to several microns. Values of thickness 28 typical of my invention include thicknesses in the range of 2 $\mu$m to 10 $\mu$m. In addition, the magnitude of surface deformations from an undeformed state of the first surface of media 24 in response to electrostatic forces applied to conductor 30 typically lie within a range from a fraction of a wavelength to approximately a wavelength. Consequently, the percent variations in thickness 28 of layer 24 are relatively small. This response characteristic along with the thickness 28 of the undeformed media 24 enables media 24 to be treated as an essentially semi infinite media, independent of the deformation state of the first surface of the media, for the purpose of determining the influence of the media on the amplitude reflection characteristics of the dielectric reflector.

This enables a dielectric reflector to be designed to provide a fixed amplitude reflection characteristic of any surface deformation state required to achieve a desired phase modulation of a wavefront which traverses media 24 in the manner described herein.

Applicant emphasizes that reflector 98 is stationary and establishes a stationary mechanical boundary condition on surface 104 of media 24. Surface 104 of media 24 is stationary due to surface 104 being adjacent to and in contact with the stationary reflector 98. Accordingly, electrostatic forces applied to conductor 30 influence surface deformations of the first surface of media 24 and variations in thickness 28 of media 24. As identified herein, variations in the surface deformation of the first surface of media 24 and the associated variations in thickness 28 influence the phase of a wavefront which is incident on conductor 30, traverses media 24 and is incident on and reflected by reflector 98 to traverse media 24 a second time and issue from target 90.

Due to the magnitude of thickness 28 when media 24 is in an undeformed state relative to the optical thickness of the alternating layers of material comprising reflector 98, variations in thickness 28 of media 24 associated with electrostatic forces applied to conductor 30 are of essentially no consequence in determining the amplitude reflection characteristics associated with the dielectric reflector of my invention. This is attributed to the assumption that regardless of the surface deformation state of the first surface of media 24, media 24 can be treated as a semi infinite media adjacent to dielectric reflector 98 for the purpose of determining the amplitude reflection characteristics of reflector 98. Factors relating a semi infinite media adjacent to a multilayer dielectric reflector can be found in the book titled "Optics" by Height and Zajec, copyright 1974, section 9.9, titled "Applications of single and Multilayer Films". My invention enables reflector 98 and media 24 to exhibit different response characteristics to electrostatic forces applied to conductor 30. Reflector 98 is stationary. Thickness 102 of reflector 98 is a constant, independent of time. This aspect of my invention is fundamental to establishing a stationary boundary condition on surface 104 of media 24.

Affixed to second surface 94 of photoconductive substrate 92 is a grille electrode structure 108. Structure 108 further includes a plurality of first conductive fingers 110. Adjacent fingers 110 are displaced by a first period 112. First period 112 is perpendicular to thickness 96. Fingers 110 are electrically connected by a first buss 114. Structure 108 further includes a plurality of second conductive fingers 116. Adjacent fingers 116 are displaced by period 112. Fingers 116 are electrically connected by a second buss 118. Each first finger 110 and each second finger 116 further includes a finger width 120. Width 120 is parallel to first period 112. Each finger 110 and each finger 116 further includes a finger thickness 122. Thickness 122 is perpendicular to surface 94. Each finger 110 and each finger 116 further includes a finger lateral dimension 124. Dimension 124 is perpendicular to thickness 122 and first period 112. Fingers 110 and fingers 116 are interwoven to create grille electrode structure 108.

First buss 114 is electrically connected to a first voltage source 126. Second buss 118 is electrically connected to a second voltage source 128. Conductor 30 is electrically connected to a third voltage source 130. As well understood by those knowledgeable in the state of the art, electrically connecting first buss 114 and second buss 118 to respective voltage sources and applying a voltage to conductor 30 allows a periodic electric field to be established in target 90. The electric fields are not shown in the target for convenience. Polarity and magnitude of the voltage sources are selected to be compatible with the resolution and speed of response requirements for the application under consideration. Such considerations are well understood by those knowledgeable in the state of the art.

Conductive fingers have high contact resistance with the photoconductor substrate so that space charge can build up. Irradiating the second surface of the photoconductor relaxes periodicity in the electric field due to charge redistribution which shields the fingers of the grille structure. The electric fields are not shown in the figure. Inhomogeneous electric fields leads to deformations of the conductor and the first surface of the single layer of media. Deformations of the conductor and the first surface of the media lead to variations in the thickness of the media which leads to optical path length differences in a wavefront which traverses the target. Optical path length variations leads to phase modulations of the wavefront.

A transmissive support plate 170 is affixed to photoconductor substrate 92 to provide mechanical support. Plate 170 is optional.

A write-in wavefront containing a desired wavelength(s) is represented by light rays 132. Rays 132 are incident upon second surface 94 of substrate 92. As well understood by those knowledgeable in the state of the art, the write-in wavefront is a two dimensional information bearing signal. The spatial distribution of irradiance associated with the write-in wavefront forms an input image which influences the periodicity of the electric fields in target 90 which effects the deformations of deformable media 24. Due to the method of operation associated with target 90 of FIG. 3, areas of target 90 which overlap irradiated areas of second surface 94 will tend toward relaxed surface deformations, i.e. layer 24 will tend toward a smooth layer in such regions.

A read-out wavefront containing a desired wavelength(s) which is incident on conductor 30 is represented by rays 134. Due to conductor 30 being transmissive, the wavefront is able to traverse media 24 and impinges on and is reflected by reflector 98 to again traverse media 24 a second time and issue from target 90. Thickness variations in media 24 will lead to optical path length variations in the wavefront which traverses media 24. Optical path length variations and/or differences leads to wavefront phase modulations.

The wavefront which issues from target 90 is represented by diffracted rays 136. In depicting rays 136 in the figure, it is assumed that write light conditions are such that layer 24 is smooth. Optical path length variations are dependent upon the index of refraction N of media 24, the wavelength of the read-out wavefront, and thickness variations of media 24. Thickness variations are influenced by mechanical properties associated with conductor 30, and physical properties of media 24 as well as the previously mentioned electric fields and/or electrostatic forces. Surface tension on the deformable surface of the deformable media is an additional property which influences response characteristics of media 24.

As previously indicated, the write-in image which is incident upon the photoconductive substrate influences the thickness variations of the media. In this manner, the read-out wavefront is phase modulated in accordance with an information bearing signal.

Applications for the target of my invention include real time display applications, such as HDTV displays, storage applications, wavelength converters, image amplifiers. Material selection for various components is influenced by the nature of the application involving the targets. Applications involving long term storage preferably utilized a nonlinear high-resistivity photoconductor.

Figure 4:
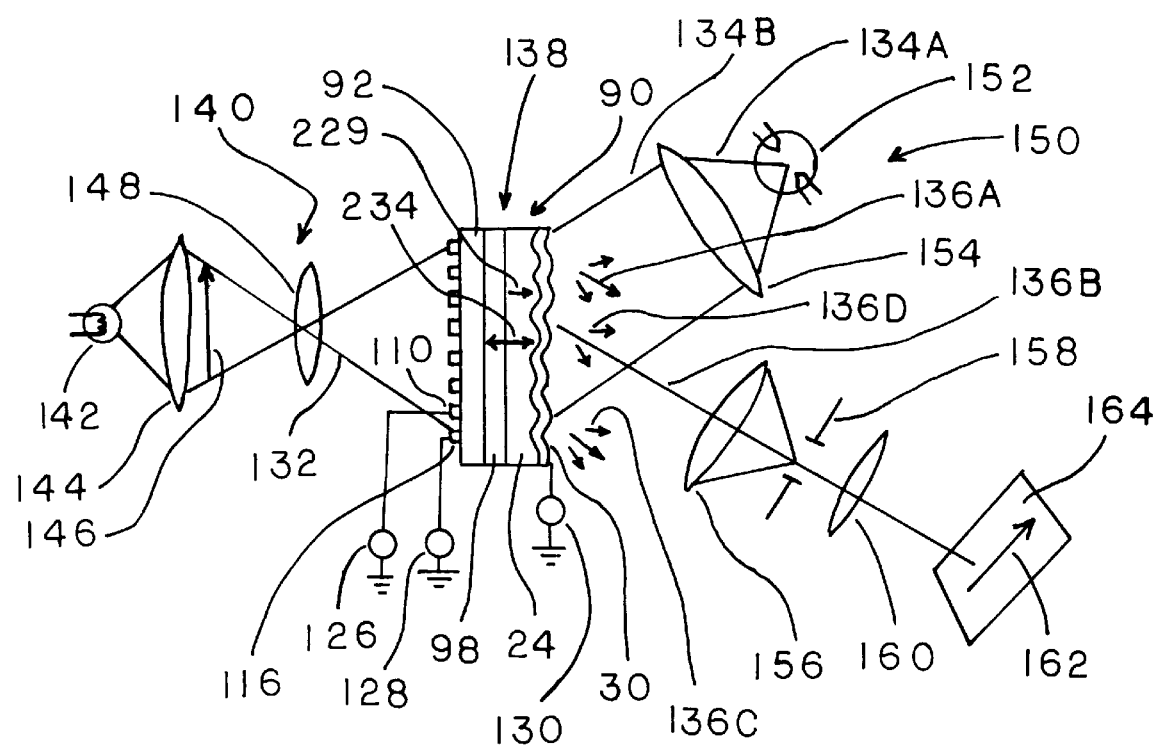
FIG. 4 shows an optically addressed surface deformation type wavefront phase modulator utilizing schlieren optics.

FIG. 4 shows an optically addressed spatial light modulator 138. Modulator 138 further includes optically addressed target 90. Target 90 is shown without the optional support plate in this figure. Conductor 30 is connected to source 130, first conductive fingers 110 are electrically connected to source 126 and second conductive fingers 116 are electrically connected to source 128. The first buss and second buss associated with target 10 are not visible in the figure. Although the electrical connection of conductive finger to voltage sources has been depicted differently in FIG. 4 than in FIG. 3 for convenience, the function remains the same.

Modulator 138 further includes a write light device 140. Device 140 further includes a write light source 142, a condenser lens 144, a transparency 146, a relay lens 148. As well understood by those knowledgeable in the state of the art, device 140 is utilized irradiate the second surface of photoconductive substrate 92 with an image of transparency 146. The image of transparency 146 is represented by write-in rays 132. The image of transparency 146 provides an information bearing signal to influence the deformations associated with target 90. Spatial transmission variations in transparency 146 leads to variations in the irradiance of the image incident upon the second surface of photoconductor substrate 92.

As well understood by those knowledgeable in the state of the art, irradiance variation on photoconductive substrate 92 leads to variations in the electric fields present in media 24. An electric field component 229 is shown in FIG. 4 to represent that electric fields are present in my invention. No effort as been made for component 229 to represent the spatial nature of the electric fields in my invention. As previously identified, inhomogeneous electric fields present in my invention will lead to electrostatic forces on conductor 30. The electrostatic forces are not shown in the figure for convenience. Techniques for establishing and controlling electric fields and hence electrostatic forces acting on conductor 30 are electric field control means.

Inhomogeneous electric fields in media 24 are related to the electrostatic forces applied to conductor 30. As previously identified, conductor 30 is affixed to the first surface of media 24. The first surface of media 24 is not visible in the figure. Varying electrostatic forces applied to conductor 30 varies deformation of the first surface of media 24. As previously identified, the second surface of media 24 is stationary and deformations of the first surface of media 24 lead to thickness variations in media 24. Thickness 234 is utilized to characterize variations in separation between the first surface of media 24 and substrate 92. Since reflector 98 is stationary. Variations in the thickness of media 24 can be related to variations in thickness 234. Variations in thickness 234 are related to optical path length variations associated with a wavefront which traverses layer 24.

Modulator 138 further includes a schlieren projector 150. Projector 150 further includes a read-out light source 152 to generate a read-out wavefront which is represented by light rays 134. Rays 134 diverge from source 152 and are collected by a collimating lens 154 which directs collimated rays 134 to target 90. Conductor 30 is transmissive and the wavefront traverses media 24 impinges on and is reflected by reflector 98 to again traverse media 24 and then issue from target 90. Light rays are not shown traversing media 24 in the figure for convenience.

Light rays 136 which issue from target 90 are focused by a schlieren lens 156 onto a pin hole aperture 158. A second lens 160 collects the rays 136 which pass through aperture 158 and projects a target image 162 of target 90 onto a screen 164. Lens 160 is adjusted to image target 90 onto screen 164. Aperture 158 is designed to pass rays 136 issuing from regions of target 90 which are "smooth" due to overlapping regions of the photoconductor substrate 92 which are irradiated by write light. Such considerations are well understood by those knowledgeable in the state of the art. Schlieren projectors are well understood by those knowledgeable in the state of the art, and consequently projector 50 is shown in a simplified manner.

Screen 164 is a reflective lambertian screen utilized to transform irradiance variations associated with image 162 to brightness variations associated with image 162. The device of FIG. 4 is the preferred embodiment of my invention.

Photoconductive materials which are utilizable as the substrate in my invention includes CdS, Si, or CdS powder in plastic gelatin binder.

Materials which are utilizable as a transmissive deformable conductor include indium tin oxide and transmissive conducting polymers. Transmissive conducting polymers are well understood by those knowledgeable in the state of the art. The transmissive deformable conductor of my invention eliminates reflectivity considerations associated with deformable conductors. Eliminating reflectivity considerations associated with the deformable conductor of my invention avoids the pitfalls of prior art devices which utilize deformable reflectors.

Several materials are utilizable for the single layer of transmissive deformable media of my invention. A transmissive gel, similar to what is described in U.S. Pat. No. 3,835,346 to Mast et al, Sep. 10, 1974 is utilizable in my invention. Gels for use in my invention include weakly cross-linked silicone rubbers or methyl siloxane having a modulus of elasticity of about 0.1 kg per square cm.

Polymers, and elastomers similar to what is utilized with the device described in the article titled "The Ruticon Family of Erasable Image Recording Devices" by N. K. Sheridon, IEEE Transactions on Electron Devices, September 1972 are utilizable in my invention.

Transmissive viscoelastic substances are utilizable in my invention. Quoting from the reference titled "Theoretical Analysis of an Electrically Addressed Viscoelastic Spatial Light Modulator" by R. Tepe, Vol. 4, No. 7/July 1987/J. Opt. Soc. Am. A, "It is characteristic of viscoelastic materials to possess the properties of an ideally elastic solid as well as those of a viscous liquid.". Accordingly, viscoelastic layers exhibit rubbery attributes. Values for viscosity and other properties, such as shear modulus, which are representative of viscoelastic layers utilizable in my invention are identified in the reference cited herein. As indicated in the reference, shear modulus values include the range of values from $5 \times (10^{}3)$ N/($M^{}2$) to $10^{}5$, where the symbol  indicates the power to which the base of ten is raised. See for instance, FIG. 3 of the reference titled "Theoretical Analysis of an Electrically Addressed Viscoelastic Spatial Light Modulator".

Additional criteria for establishing guidelines for identifying transmissive deformable media materials for use in my invention includes the information presented in the report titled "Dielectric Membrane Light Valve Study" by Eugene T. Kozol et al, RADC-TR-71, section 3.1.4 "Deformation of the Elastomer According to Plane Theory of Elasticity". An assumption which is often utilized in modeling the deformation characteristics of certain media layer materials involves assuming the media layer is incompressible. As quoted from the cited reference, "Most rubber-like substances have Poisson's ratio's exceeding 0.49 so for such material, the order of magnitude of the deformations in FIG. 29 seems reasonable.".

As identified in the article titled "The Ruticon Family of Erasable Image Recording Devices" reflecting light from within the elastomer layer causes the greatest modulation of the read-out light. My invention emulates this attribute of the conductive liquid Ruticon and I believe that my invention provides this benefit. All target configurations of my invention provide a double pass through the deformable media.

In addition, by utilizing a transmissive deformable conductor affixed to the single layer of transmissive deformable media, my invention eliminates gaps and/or extraneous substrates and provides an elastic means to enhance speed of response.

Characteristics associated with utilizing an incompressible media in surface deformation wavefront phase modulators is described in the article titled "The Ruticon Family of Erasable Image Recording Devices" and the article titled "Deformable-Mirror Spatial Light Modulators" by Larry J. Hornbeck, SPIE Critical Review Series Vol. 1150. As described in the cited references, side lobes and protrusions of the media accompany the compressions of the media layer. Assumptions in modeling the deformable media of my invention include the media being isotropic.

Figure 5:
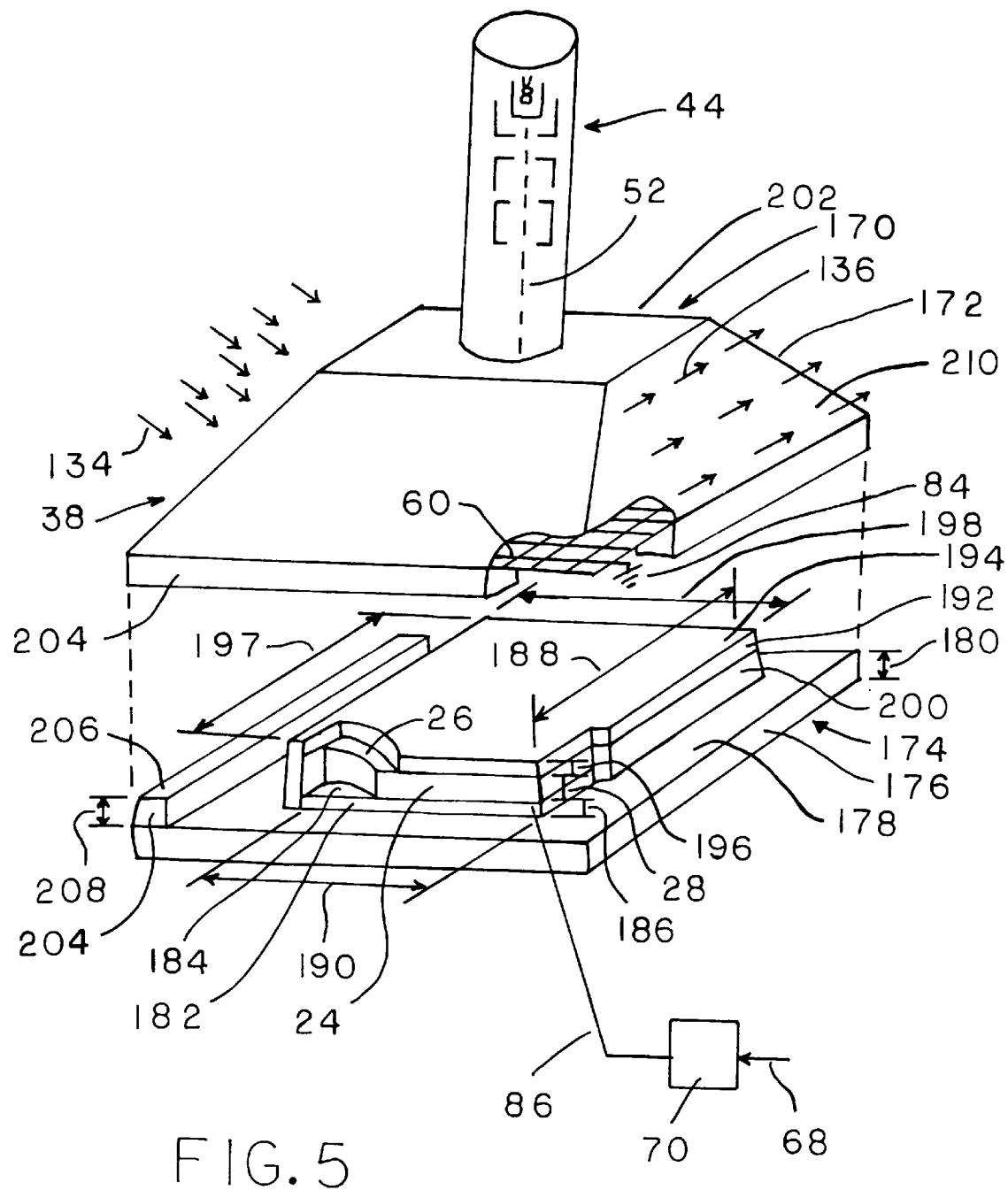
FIG. 5 shows an electron beam addressed phase modulator which utilizes a transmissive deformable insulator and an essentially non deforming reflective electrode affixed to a rigid substrate.

FIG. 5 shows an electron beam addressed phase modulator 170. FIG. 5 utilizes the same reference designations as utilized in FIG. 2 where appropriate. Modulator 170 further includes an electron beam addressing mechanism 38. Mechanism 38 further includes a vacuum envelope 172. Envelope 172 is given a different designation than the vacuum envelope of FIG. 2 due to a different geometry which is compatible with the propagation of a wavefront through envelope 172. Envelope 172 further includes a faceplate target 174. Target 174 further includes a faceplate 176. Materials utilizable for faceplate 176 includes glass. Faceplate 176 further includes a first faceplate surface 178 essentially parallel to and separated from a second faceplate surface by a faceplate thickness 180. The second faceplate surface is not visible in the figure. Faceplate 176 is an essentially non deforming, rigid support.

Target 174 further includes a conductive monolithic reflective electrode 182 affixed to surface 178. Materials utilizable for electrode 182 includes aluminum. Electrode 182 further includes a first electrode surface 184 essentially parallel to and separated from a second electrode surface by an electrode thickness 186. The second electrode surface of electrode 182 is affixed to and in contact with surface 178. The second electrode surface of electrode 182 is not visible in the figure.

Electrode 182 further includes a first lateral dimension 188 and a second lateral dimension 190. Dimension 188 and dimension 190 are perpendicular to thickness 186. Dimension 188 is perpendicular to dimension 190. Techniques to affix a conductive reflective electrode to the surface of a glass faceplate include vacuum deposition techniques such as evaporation or sputtering. Faceplate 176 is essentially rigid and non deforming. Affixing electrode 182 to faceplate 176 results in an essentially rigid, non deforming reflective means. Electrode 182 is a stationary reflective means.

Affixed to first surface 184 is a single layer of transmissive deformable media 24. Media 24 is a single layer of transmissive deformable material. Materials utilizable for use as the transmissive deformable media of my invention have been previously identified and include elastomers and viscoelastic substances.

Media 24 further includes a first surface 26 separated from a second surface of layer 24 by media thickness 28. Layer 24 is shown in an undeformed state. Affixed to surface 26 is a transmissive deformable insulating layer 192. Layer 192 is a highly transparent, essentially non reflecting deformable insulating layer. Layer 192 further includes a first layer surface 194 separated from a second layer surface by a layer thickness 196. The second layer surface of layer 192 is in contact with surface 26. The second layer surface of layer 192 is affixed to surface 26. The second layer surface of layer 192 is not visible in the figure. Materials utilizable for layer 192 includes glass. Additional materials utilizable for use as the transmissive deformable insulating layer of my invention includes polystrene and magnesium-oxide. Utilizing the information provided herein, those knowledgeable in the state of the art will be able to identify materials which are utilizable with my invention. See for instance U.S. Pat. No. 3,835,346 to Mast, Sep. 10, 1974. Mast fails to provide a stationary reflective means and/or a configuration which possesses the advantages of my invention such as a double pass through the modulating medium.

Affixing layer 192 to surface 26 provides an elastic means to influence the speed of response of layer 24. Utilizing the information provided herein, those knowledgeable in the state of the art will be able to determine appropriate characteristics for layer 192 for use in my invention. Affixing layer 192 to surface 26 of media 24 provides an elastic means to influence the speed of response of the media of my invention.

Layer 192 further includes a first lateral dimension 197 and a second lateral dimension 198. The second surface of layer 192 is affixed to a support ring 200. Affixing layer 192 to ring 200 provides a seal for layer 24, avoiding the necessity of subdividing envelop 172 into two chambers. Information concerning such considerations are provided in the references cited herein. See for instance U.S. Pat. No. 3,385,346 to Mast et al. Ring 200 is shown cut away in the figure for convenience. Dimensions 197 and 198 are selected relative to dimensions 188 and 190 to enable layer 192 to be affixed to ring 200.

Vacuum envelope 172 further includes a bell housing section 202. Modulator 170 further includes a electron collector mesh 60 affixed to section 202. Affixed to section 202 are a plurality of side standoffs 204. Each standoff 204 further includes a first surface 206 essentially parallel to and separated from a second standoff surface by a standoff thickness 208. FIG. 5 is shown in an exploded view to reveal certain features of my invention. Thickness 208 is parallel to thickness 28. Thickness 208 is selected so that surface 194 of layer 192 is separated from mesh 60 by a separation gap when layer 24 is in an undeformed state. The separation gap is not shown in the figure. Values for the separation gap can range from a few microns to 50 microns or larger values such as 100 microns. The minimum value of the separation gap is selected to avoid mechanical interference with protrusions of surface 194 when layer 24 is in a deformed state. The second surface of standoffs 204 are not visible in the figure. Standoffs 204 are shown affixed to section 202 and faceplate 176 in the exploded perspective of FIG. 5.

Alternatively, a conductive grid, either transmissive or reflective could be applied to the insulating layer of my invention. The impact of the mechanical properties of the grid structure on the deformation characteristics of the insulating layer could be utilized influence phase modulation characteristics of my invention.

Mechanism 38 further includes an electron beam gun 44 for generating an electron beam 52. Beam 52 is utilized to deposit electronic charge on layer 192 by an equilibrium writing means. Electronic charge is not shown in the figure. Equilibrium writing means was explained earlier, and FIG. 5 is shown in a simplified manner for convenience. Accordingly, layer 192 must be capable of producing a secondary electron emission ratio of greater than unity when bombarded with electrons which possess an acceleration energy which exceed the first crossover point associated with secondary electron emission ratio curve versus energy of primary electrons incident on the layer material. Utilizing the information provided herein, those knowledgeable in the state of the art will understand the influence of mesh 60 on establishing an equilibrium potential of target 174 relative to the potential applied to mesh 60.

Electrode 182 is electrically connected to electronic processing module 70. An information bearing signal 68 is applied to module 70. Mesh 60 is electrically connected to ground potential 84. Module 70 applies a voltage signal 86 to electrode 182 to vary the potential difference between electrode 182 and mesh 60 in accordance with signal 68 and in synchronism with the scanning of electron beam 52. Deflection means for scanning electron beam 52 have been explained previously and are not shown in the figure for convenience.

Equilibrium writing utilized with modulator 170 establishes an electronic charge on layer 192 of modulator 170 in accordance with signal 68. The electronic charge deposited on layer 192 of modulator 170 at each incremental area is dependent upon the potential difference applied between electrode 182 and mesh 60 at the time the incremental area is bombarded with electrons by the scanning electron beam 52. Layer 192 is an insulator and the surface resistivity and volume resistivity are selected to enable charge storage. Charge storage on insulating layers and the requirements for surface and volume resistivity as a function of charge storage time are well understood by those knowledgeable in the state of the art.

Due to the charge distribution deposited on layer 192 by scanning electron beam 52 and utilizing an equilibrium writing method, electrostatic forces act on layer 192 in accordance with signal 68 which results in the deformation of layer 192 and surface 26 of media 24 resulting in thickness variations of media 24. Thickness variations in media 24 will lead to optical path length variations and hence phase modulations of a wavefront which traverses media 24.

Housing section 202 further includes a first transparent side window and a second transparent side window 210. The first transparent side window is not visible in the figure. A collimated wavefront, represented by rays 134 is incident on the first transparent side window. Due to geometry of envelope 172, the collimated wavefront represented by rays 134 is transmitted by mesh 60 and is incident on surface 194 of layer 192. Since layer 192 is highly transparent and essentially non reflecting, the wavefront traverses media 24 of target 174 and is incident on and reflected by electrode 182 to traverse the single layer of media 24 a second time and issue from target 174.

Electrostatic forces applied to layer 192 which are related to the charge deposited on layer 192 due to equilibrium writing results in optical path length variations in the wavefront traversing target 174. Optical path length variations lead to wavefront phase modulations. The wavefront which issues from target 174 is transmitted by mesh 60 and then exists modulator 170 through second side window 210 as diffracted rays 136. Accordingly, wavefront phase modulations are related to information bearing signal 68.

The phase modulations imparted to the wavefront which traverses media 24 can be converted to irradiance modulations by the use of a schlieren optical system. A schlieren optical system is not shown in FIG. 5 for convenience. Applicant notes that the geometry of modulator 170 has the advantage of enabling mesh 60 to be utilized as an optical data processing component due to the wavefront being transmitted by mesh 60 prior to being incident on layer 192 and after traversing target 174. This enables several unique features to be implemented with Applicant's invention.

Utilizing the information provided herein additional optical data processing and/or holographic applications and/or configurations will be obvious to those knowledgeable in the state of the art.

Use of an equilibrium writing means to enable a scanning electron beam 52 to deposit electronic charge on insulating layer 192 of my invention in synchronism with the potential difference applied between the reflective electrode 182 and electron collector mesh 60 is an electrostatic force means.

The electrostatic force means establishes electrostatic forces on the transmissive deformable insulating layer 192 to control the deformations of layer 192 and the single layer of transmissive deformable media 24. As identified herein, alternative electrostatic force means exist and includes utilizing transmissive deformable conductors.

FIG. 6 shows a cross sectional profile of target 10 with dielectric reflector 18 shown in detail. Reflector 18 comprises seven layers alternately of a zinc suphide layer 212 and a cryolite layer 214, the thickness of each layer is dependent on the quarter wavelength of the light to be reflected by reflector 18. In order to increase the secondary emission coefficient of reflector 18, a cryolite layer 216 with double thickness is added. Due to the method of affixing reflector 18 to substrate 12, and the material properties of the alternating layer utilized in the reflector, reflector 18 is stationary with time, i.e. reflector 18 is essentially rigid and non deforming. The single layer of media 24 and conductor 30 of target 10 deform in response to electric fields applied to target 10. Electric field are not shown in the figure for convenience. Use of target 10 enables a single layer of transmissive deformable media 24 to function as a phase modulator. The phase modulator of my invention eliminates extraneous deformable layers required in interference modulators such as U.S. Pat. No. 5,044,736 to Jaskie, Sep. 3, 1991.

Additional materials which are utilizable as an essentially non deforming multilayer dielectric reflector are identified in the references cited herein. Additional materials include inorganic materials. Additional materials utilizable for the alternating layers of the dielectric reflector of my invention include titanium dioxide and calcium fluoride. Additional information is provided in the references cited herein.

Figure 7:
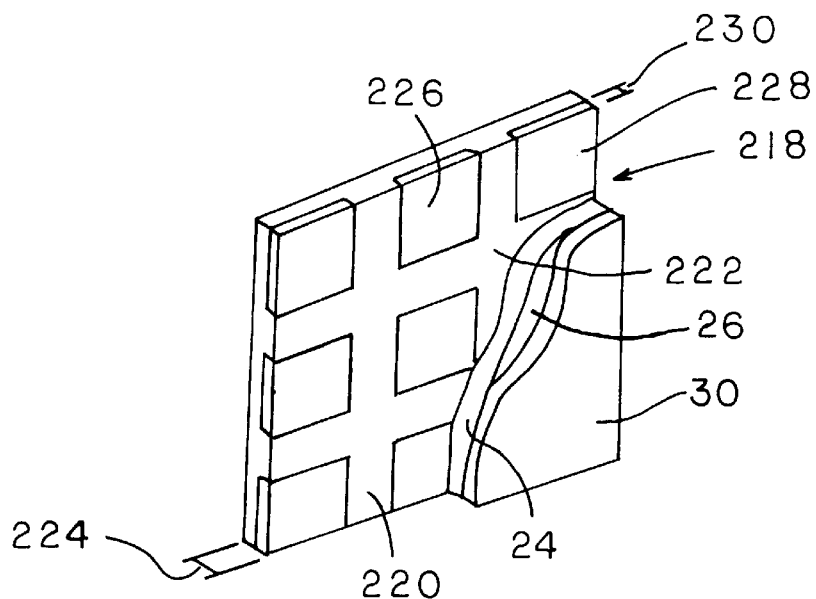
FIG. 7 shows a target utilizing a plurality of reflective electrodes affixed to a substrate as a reflective means.

FIG. 7 shows yet another target 218. Target 218 further includes a substrate 220. Substrate 220 further includes a first surface 222 and a second surface. The second surface of substrate 220 is not visible in the figure. Surface 222 and the second surface of substrate 220 are essentially parallel and separated by a substrate thickness 224. Affixed to substrate 220 is a plurality of conductive reflective electrodes 226. Electrodes 226 further includes a first electrode surface 228 and a second electrode surface. The second electrode surfaces of electrodes 226 are not visible in the figure. Surface 228 and the second surface of electrode 226 are separated by an electrode thickness 230. Materials suitable for use as electrodes includes Aluminum.

Electrodes 226 are recessed in substrate 220 so that first surface 228 of each electrode 226 is coplanar with first surface 222 of substrate 220. Electrodes 226 are depicted in a two dimensional array. Techniques to recess electrodes in an insulating substrate are provided in the references cited herein. Affixed to surface 222 of substrate 220 and surface 228 of each electrode 226 is a single layer of media 24. Affixed to surface 26 of media 24 is conductor 30. Target 218 utilizes a single layer of media 24 adjacent to a conductive reflective stationary reflective means.

Several techniques may be utilized to address the target of FIG. 7. The second surface of substrate 220 is capable of being electron beam addressed. Considerations involved in selecting substrate materials for use with my invention includes the secondary electron emission ratio of the substrate. Such considerations are well understood by those knowledgeable in the state of the art. Utilization of target 218 provides an alternative for establishing and/or affixing a reflective means to a substrate. Alternative addressing techniques include each electrode being electrically connected to a respective field effect transistor. Configurations utilizing thin film transistors are identified in the references cited herein.

CONCLUSIONS, RAMIFICATIONS AND SCOPE OF INVENTION

Thus the reader will see that the surface deformation wavefront phase modulator of my invention provides an efficient means for enhancing the performance attainable by surface deformation type wavefront phase modulators. While my above description contains many specificities, these should not be construed as limitations on the scope of the invention, but rather as an exemplification of one preferred embodiment thereof.

By integrally associating a reflective means with the substrate, my invention avoids pitfalls that have plagued prior art devices.

Several other addressing mechanisms are utilizable with my invention to establish and vary the electric fields in the target of my invention. As identified in the patent application titled "Electronically Addressed Deformable Media Light Modulator" admitted to Craig D. Engle, Ser. No. 08/180,029 filed Jan. 11, 1994, thin film transistors are utilizable as an addressing mechanism to assist in establishing electrostatic forces on the transmissive deformable conductor of my invention.

Although the transmissive deformable conductor of my invention has been depicted as a monolithic conductor, as identified in the patent application titled "Poppet Valve Modulator" admitted to Craig D. Engle, Ser. No. 08/020, 692, filing date Feb. 22, 1993, my invention accommodates transmissive deformable column conductors. As identified in the references cited herein, such conductor means facilitates elimination of electrical crossover networks in active matrix arrays. As such, my invention enhances reliability of active matrix addressed surface deformations type wavefront phase modulators.

Distinguishing features of my invention includes consolidating a substrate with a reflective means to avoid the complications of prior art which utilized deformable reflectors affixed to deformable media. By incorporating the reflective means with the substrate, my invention avoids pitfalls of prior art. Applicant's invention provides an essentially non deforming rigid substrate to affix an essentially rigid, non deforming, stationary reflective means.

As identified in the cited patent applications admitted to Craig D. Engle, an opaque substrate facilitates isolation of addressing components. The substrate of my invention is capable of being made opaque to assist in preventing the incident light from intruding on control elements thereby enhancing it's functionality.

In addition, surface deformation type wavefront phase modulators have utilized discrete electronic control elements, such as field effect transistors, fabricated in semiconductor substrates. As cited in applicant's referenced patent applications, semiconductor substrates are utilizable with my invention. Accordingly, substrate options for use in my invention include semiconductive substrates which contain discrete electronic switching elements.

Due to the storage capability inherent to my invention, application of electric fields by the addressing mechanism may be applied prior to a read-out wavefront. Such considerations may be important in applications involving my invention, such as holographic applications. Storage capability of my invention enhances efficiency over prior art which utilized fluid control layers.

Utilizing the information contained herein, it will become obvious that alternative addressing configurations and/or mechanism may be utilized with my invention. Alternative photosensitive elements, such as photodiodes, are utilizable to establish electric fields in the target of my invention. Considerations such as the spectral responsitivity and semiconductor band gap of a photoconductive substrate, in addition to the wavelength(s) of the read and write light and spectral reflectivity of the dielectric reflector are utilizable as variables to influence the design of the target. Design considerations include items such as the sequence associated with the arrangement of the substrate, dielectric reflector, media layer etc.

Although an equilibrium writing method was described with the electron beam addressing mechanism, alternatives are utilizable with my invention. Alternative electron beam addressing mechanism include the technique described in U.S. Pat. No. 3,626,084 to Wohl et. al, Dec. 7, 1971.

In addition, the electronic processing module associated with the electron beam addressing module of my invention is capable of providing a transformation of the information bearing signal to a sinusoidal type charge distribution for use with my invention. The sinusoidal type charge distribution is capable of being amplitude modulated in a manner related to the information bearing signal. Charge distributions may be established via scan velocity modulations, beam current modulations, cathode potential modulations etc.

As well understood by those knowledgeable in the state of the art, alternatives to schlieren techniques are available to convert phase modulations to irradiance modulations and/or brightness variations. Such techniques include interferometeric techniques.

Due to the multitude of configurations permissible with my invention, several techniques exist for conjoining the deformable media layer to the substrate of my invention. Embodiments have illustrated deformable media layers in direct contact with the substrate, media layer connected to the substrate by means of a dielectric reflector.

Applicant's invention utilizes a highly transmissive, highly transparent, essentially non reflecting deformable member, either conductive and/or insulating. This aspect of Applicant's invention eliminates reflectivity considerations required from the transmissive deformable member thereby avoiding the performance compromises inherent with prior art devices which employed deformable reflectors. Furthermore, Applicant's invention utilizes a stationary reflective means integrally associated with a rigid support substrate to enhance the reflectivity of Applicant's invention over prior art surface deformation phase modulators. In addition, Applicant's invention eliminates extraneous components.

Use of a transmissive deformable conductor or a transmissive deformable insulating layer in contact with the surface of the transmissive deformable media which is opposite the reflective means serves as an elastic member to enhance speed of response of surface deformation type spatial light modulators. As cited in the references identified herein, prior art has utilized reflective conductors to function as an elastic member to enhance speed of response of deformable media light modulators to electrostatic forces applied to the reflective conductor. Applicant's invention enhances reflectivity, eliminates extraneous components, and increases the scope of elastic member materials which are compatible with electrostatic force means utilized to deform the transmissive media of Applicant's invention.

As previously identified, transmissive or reflective conductive grids affixed to the transmissive deformable insulating layer of my invention can be utilized as an electron collector mesh. The mechanical properties of the grid can be designed to influence the deformation behavior of the insulating layer. In addition, since the insulating layer is transmissive, and a stationary reflective means is utilized with the target, the grid structure can be optically designed to provide an adoptization effect on the wavefront which interacts with the target. Variations in the vacuum envelope utilizing such targets is possible. Use of an off axis electron gun and an on axis schlieren system provides an alternative. Use of an electron collector conductive type grid affixed to the insulating layer of my invention also enhances efficiency of my invention over prior art.

Accordingly, the scope of the invention should be determined not by the embodiment illustrated, but by the appended claims and their legal equivalents.

I claim:

1. A spatial light modulator component comprising:

a substrate, a single layer of transmissive electrostatically deformable media, said media further includes a first surface facing said substrate and a second surface opposite thereof, transmissive layer means mechanically coupled to said second surface of said media, said media is integrally associated with said substrate, reflective means opposite said second surface of said media, control means for applying electrostatic forces to said layer means, means operatively associated with said control means varying said electrostatic forces which varies separation between said layer means and said substrate.

2. The device of claim 1 wherein varying said electrostatic forces varies deformation of said layer means and said media thereby modulating a wavefront incident on said layer means and traversing said media and impinging on and reflected by said reflective means to again traverse said media and issue from said modulator.

3. The device of claim 2 wherein said modulated wavefront is a phase modulated wavefront, schlieren means to transform said phase modulated wavefront to a wavefront having identifiable irradiance characteristics.

4. The device of claim 3 wherein said layer means comprises a material selected from the group consisting of transparent electrical conductors and transparent electrical insulators, said media comprises a second material selected from the group consisting of transparent viscoelastic substances and transparent elastomers.

5. The device of claim 3 wherein said layer means comprises a transparent electrical insulator.

6. The device of claim 5 wherein said control means further comprises charge means for depositing an electronic charge on said layer means in accordance with an information bearing signal.

7. The device of claim 3 wherein said reflective means comprises a dielectric reflector means affixed to said substrate, said layer means comprises a material selected from the group consisting of transparent electrical conductors and transparent electrical insulators.

8. The device of claim 3 wherein said layer means comprises a transparent electrical conductor.

9. A spatial light modulator component comprising:

a substrate;

a capacitive pixel element comprising:
- a single layer of transmissive electrostatically deformable media,
- said media further includes a first surface facing said substrate and a second surface opposite thereof,
- said media is integrally associated with said substrate,
- transmissive layer means mechanically coupled to said second surface of said media.
- reflective means opposite said second surface of said media, electric field control means to apply electrostatic forces to said layer means of said pixel element, means operatively associated with said control means varying said electrostatic forces which varies separation of said layer means from said substrate.

10. The device of claim 9 wherein varying said electrostatic forces varies deformation of said layer means and said media thereby modulating a wavefront incident on said layer means and traversing said media and impinging on and reflected by said reflective means to again traverse said media and issue from said modulator.

11. The device of claim 10 wherein said modulated wavefront is a phase modulated wavefront,
- schlieren means to transform said phase modulated wavefront to a wavefront having identifiable irradiance characteristics.

12. The device of claim 11 wherein said layer means comprises a material selected from the group consisting of transparent electrical conductors and transparent electrical insulators,
- said media means comprises a second material selected from the group of consisting of transparent viscoelastic substances and transparent elastomers.

13. A spatial light modulator component comprising:

a substrate, a plurality of capacitive pixel elements, each said pixel element comprising:
- a single layer of transmissive electrostatically deformable media,
- said media further includes a first surface facing said substrate and a second surface opposite thereof,
- said media is integrally associated with said substrate,
- transparent layer means mechanically coupled to said second surface of said media,
- reflective means opposite said second surface of said media, electric field control means to apply electrostatic forces to said layer means of said pixel elements, means operatively associated with said control means varying said electrostatic forces which varies separation of said layer means and said second surface of said media of the pixel elements from said substrate.

14. A spatial light modulator comprising:

a substrate, transmissive electrostatically deformable media means, said media means further includes a first surface facing said substrate and a second surface opposite thereof, transmissive layer means mechanically coupled to said second surface of said media means, said media means is integrally associated with said substrate, reflective means opposite said second surface of said media means, electric field control means for applying electrostatic forces to said layer means, means operatively associated with said control means varying said electrostatic forces which varies separation between said layer means and said substrate thereby modulating a wavefront incident on said layer means traversing said media means incident on and reflected by said reflective means to again traverse said media means and issue from said modulator, schlieren means to transform said phase modulated wavefront to a wavefront having identifiable irradiance characteristics.

15. The device of claim 14 wherein said layer means comprises a material selected from the group consisting of transparent electrical conductors and transparent electrical insulators,
- said media means comprises a second material selected from the group consisting of transparent viscoelastic substances and transparent elastomers.

16. A spatial light modulator component comprising:

a substrate, a single layer of transmissive electrostatically deformable media, said media further includes a first surface facing said substrate and a second surface opposite thereof, transmissive layer means mechanically coupled to said second surface of said media means, said media means is integrally associated with said substrate, reflective means opposite said second surface of said media.

17. The device of claim 16 wherein said layer means comprises a material selected from the group consisting of transparent electrical conductors and transparent electrical insulators,
- said media means comprises a second material selected from the group consisting of transparent viscoelastic substances and transparent elastomers.

* * * * *